US012285001B1

(12) United States Patent
Nash

(10) Patent No.: US 12,285,001 B1
(45) Date of Patent: *Apr. 29, 2025

(54) INSECT REPELLENT LIGHT ASSEMBLY AND METHOD OF USE

(71) Applicant: George C Nash, Temple, GA (US)

(72) Inventor: George C Nash, Temple, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/931,398

(22) Filed: Oct. 30, 2024

Related U.S. Application Data

(63) Continuation-in-part of application No. 18/776,454, filed on Jul. 18, 2024.

(60) Provisional application No. 63/514,550, filed on Jul. 19, 2023.

(51) Int. Cl.
A01M 29/10 (2011.01)
F21S 8/08 (2006.01)
F21S 9/03 (2006.01)
F21S 10/00 (2006.01)

(52) U.S. Cl.
CPC ............... A01M 29/10 (2013.01); F21S 8/08 (2013.01); F21S 9/032 (2013.01); F21S 9/037 (2013.01); F21S 10/002 (2013.01)

(58) Field of Classification Search
CPC .......... F21S 10/002; F21S 8/08; A01M 29/00; F21V 23/04
See application file for complete search history.

(56) References Cited

U.S. PATENT DOCUMENTS

| | | | | | |
|---|---|---|---|---|---|
| 5,259,153 | A | * | 11/1993 | Olive | A01M 1/145 136/291 |
| 5,528,049 | A | * | 6/1996 | Callahan | A01M 1/02 250/493.1 |
| 6,088,949 | A | * | 7/2000 | Nicosia | A01M 1/023 43/132.1 |
| 6,301,194 | B1 | * | 10/2001 | Cauchy | A01M 29/18 119/719 |
| 8,327,577 | B2 | * | 12/2012 | Liang | A01M 1/106 43/113 |
| 10,588,307 | B2 | * | 3/2020 | Sandford | A01M 1/023 |

* cited by examiner

Primary Examiner — Christopher E Dunay
(74) Attorney, Agent, or Firm — Karen Tang-Wai Sutton

(57) ABSTRACT

The present invention is an insect repellent assembly comprising of a light source, a transparent container having a quantity of liquid, typically water, inside the container, where the light source is positioned so as to be approximately centered in relation to a surface of the liquid so that about half the light source is below the surface and the remaining half is above the surface. The amount of liquid is less than a volume of the container. The container surrounds the light source so that light emitted by the light source must pass through the container. A method of use is also provided.

19 Claims, 11 Drawing Sheets

SECTION A-A

SECTION A-A

INSECT REPELLENT LIGHT ASSEMBLY AND METHOD OF USE

CROSS-REFERENCE TO RELATED APPLICATIONS

This application is a continuation-in-part of U.S. patent application Ser. No. 18/776,454 filed 18 Jul. 2024, and further claims priority to U.S. provisional patent application Ser. No. 63/514,550 filed 19 Jul. 2023, whose disclosures are hereby incorporated by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of insect repellents, specifically, a light assembly that repels insects with eyes, without killing or otherwise injuring them.

Background Art

Many people enjoy camping, barbequing, and other outdoor recreational activities, but while engaging in those activities, insects often become a nuisance. Mosquitos and other biting flies make twilight dinners on the patio miserable, as do houseflies hovering over the picnic blanket. Moths, while typically harmless, are attracted to light and can rush inside a lit house when the front door is opened to greet a dinner guest.

Many inventions exist to repel insects. It is well known that insects are attracted to light and a common solution is to use electric devices known as bug zappers that use a light to lure the annoying insect in and electrocute it. While this might work well indoors in a bedroom, this sort of solution outside particularly at a campsite in a rural area is not practical due to the large number of insects, and sometimes exceptionally large insects or a large number of insects can cause the unit to short out or catch fire. There are also many people who are also turned off by the scorched smell of electrocuted insects and whose sleep is disturbed by the constant zapping noise of insects being electrocuted. Still others worry about the needless killing of insects, particularly since many animals such as birds, frogs, and bats eat insects and thus the bug zappers are effectively decreasing food sources for these animals. The other main issue with these electric devices is that by using light, they attract more insects to one's campsite and since not all insects will end up in the zapper, they tend to make a nuisance of themselves by pestering campers, their food and of course by biting them. Hence, the solution to annoying insects often creates more problems. As for the other types of repellents, few enjoy using chemicals on their skin, and popular aromatics such as citronella candles, have varying and often limited efficacy. Some work better for certain types of insects while failing to repel others, and often air conditions are also important. Even slightly windy conditions often render aromatics and even chemical repellents useless based on wind directionality.

What is needed is an insect repellent that works universally with all insects that have eyes. What is also needed is an insect repellent independent of weather and air conditions. What is also needed is an insect repellent that is safe for humans and other animals, including the insects themselves to decrease needless loss of life.

DISCLOSURE OF INVENTION

An insect repellent light assembly having a light source emitting a plurality of light rays surrounded by a container made of a transparent material, a quantity of liquid, typically water, inside the container, and a mount that positions the light source so as to be approximately centered with a surface of the quantity of liquid, such that approximately half of the plurality of light rays emitted by the light source are below the surface of the quantity of liquid and the remaining half of the plurality of light rays are above the surface.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
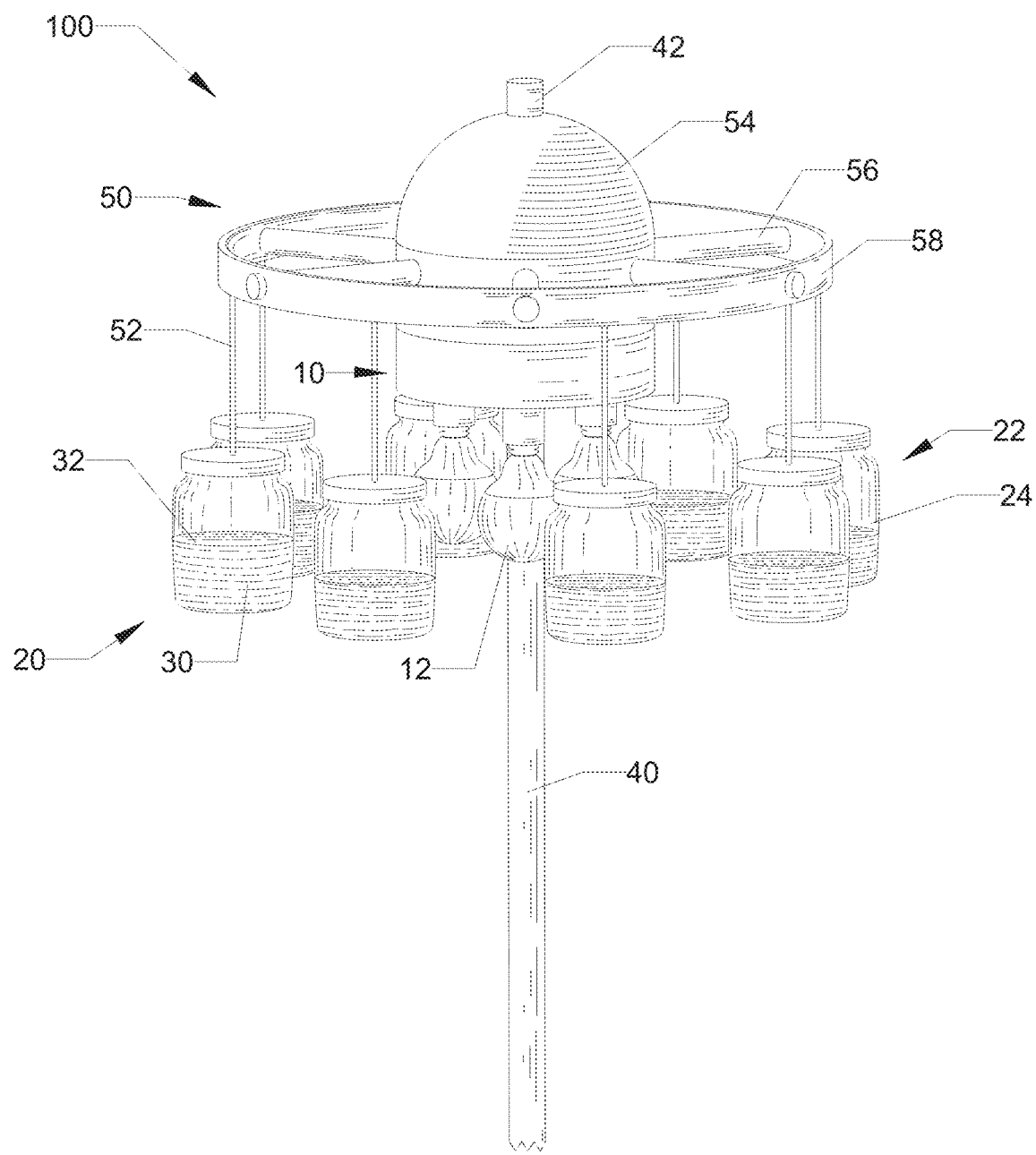
FIG. 1 is a perspective view of an insect repellent light assembly according to the invention.

The following is a list of reference labels used in the drawings to label components of different embodiments of the invention, and the names of the indicated components.
100 insect repellent light assembly
10 light assembly
12 light source
14 cage
20 container assembly
22 container
24 container wall or wall
26 cavity
30 liquid
32 surface of liquid
40 lower mount or pole mount
42 upper mount
44 base
46 power source
46a solar panel
46b generator
48 power switch
50 frame
52 support
54 top portion
56 arm
60 light wave
62 glare

DETAILED DESCRIPTION

Figure 2:
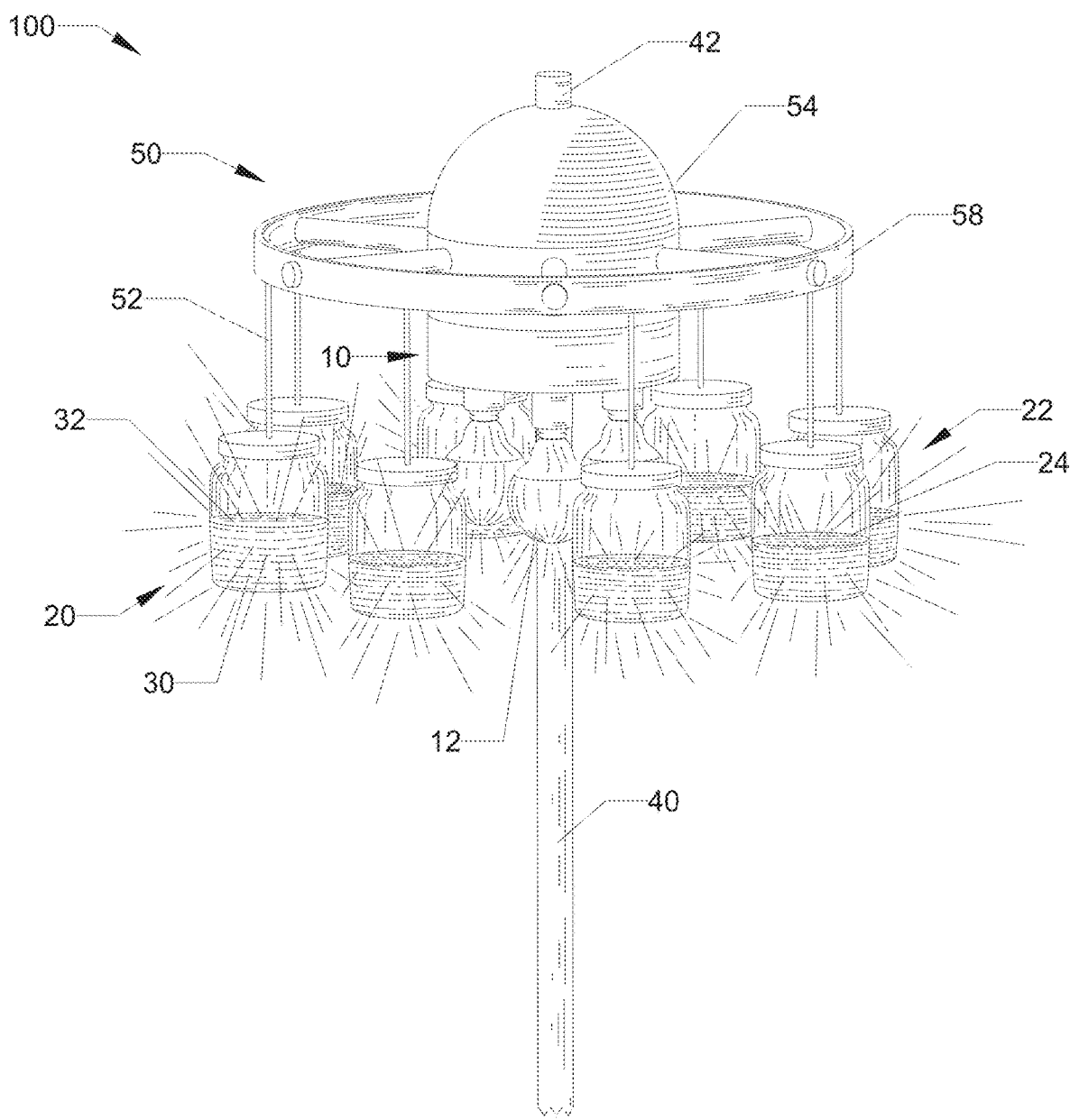
FIG. 2 is a perspective view of the insect repellent light assembly according to the invention of FIG. 1, shown as it would appear in use.
Figure 3:
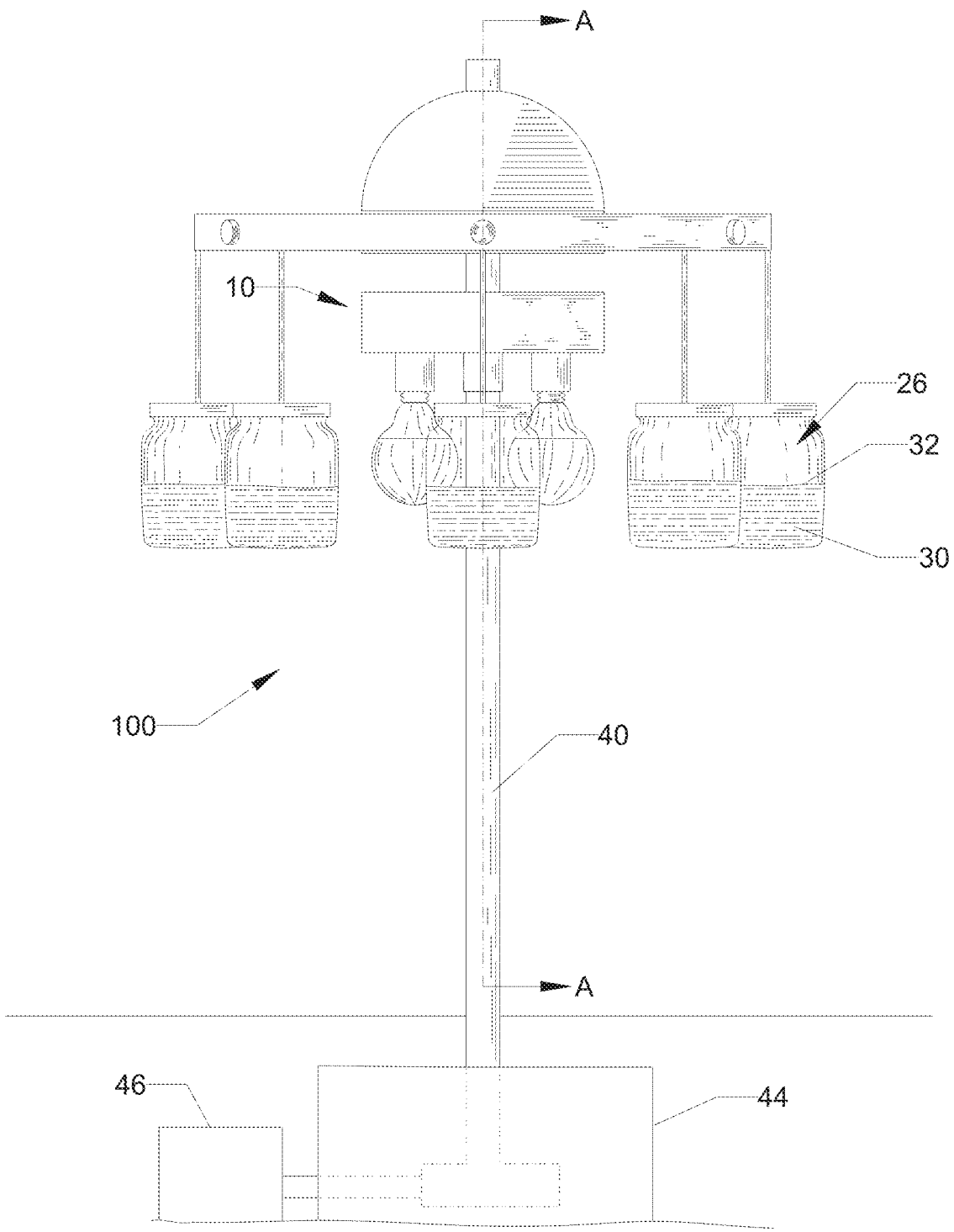
FIG. 3 is a first side elevation view of the insect repellent light assembly in FIG. 1.
Figure 4:
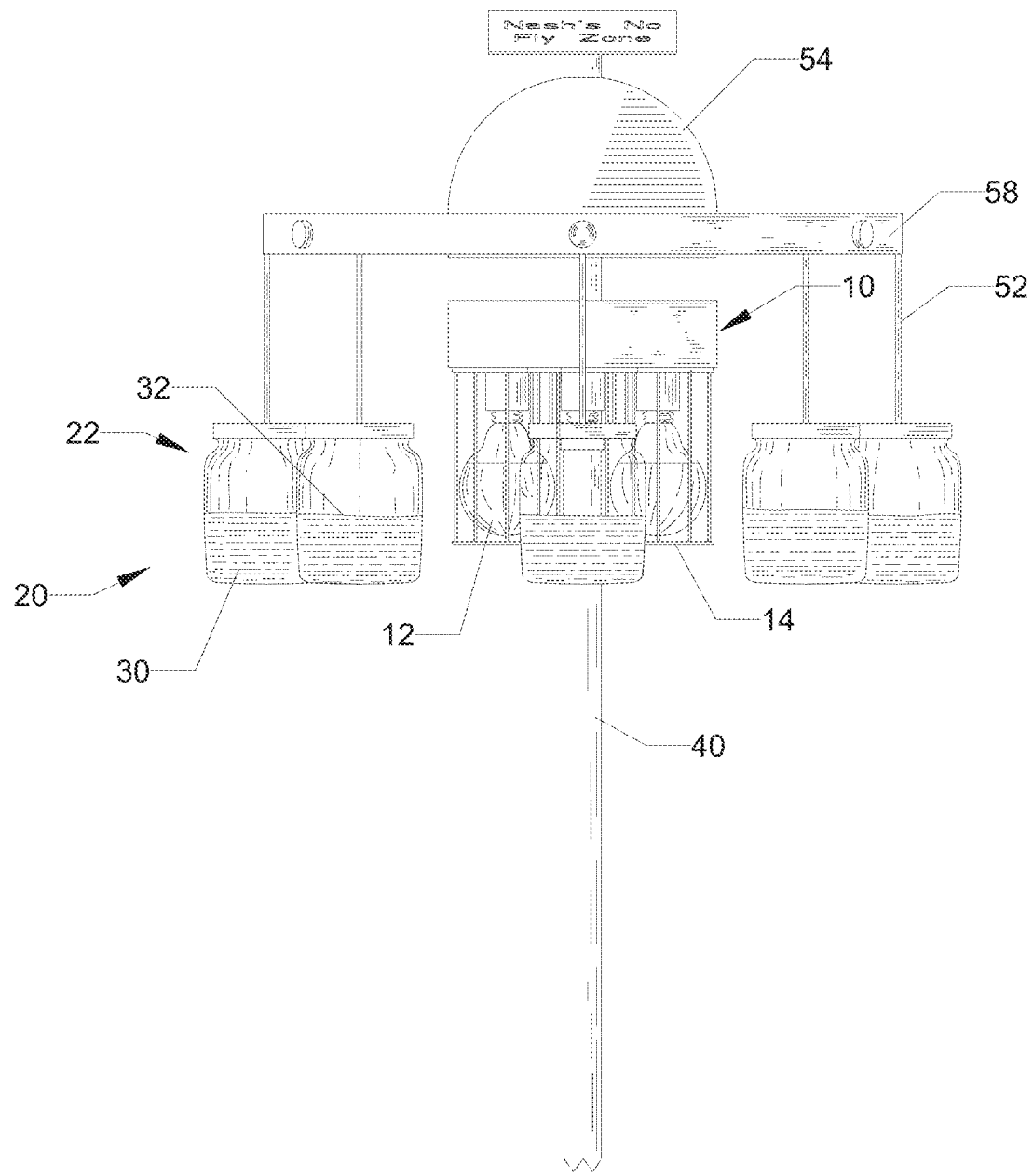
FIG. 4 is a second side elevation view of the insect repellent light assembly according to the invention, shown with an optional cage surrounding the light source.
Figure 5:
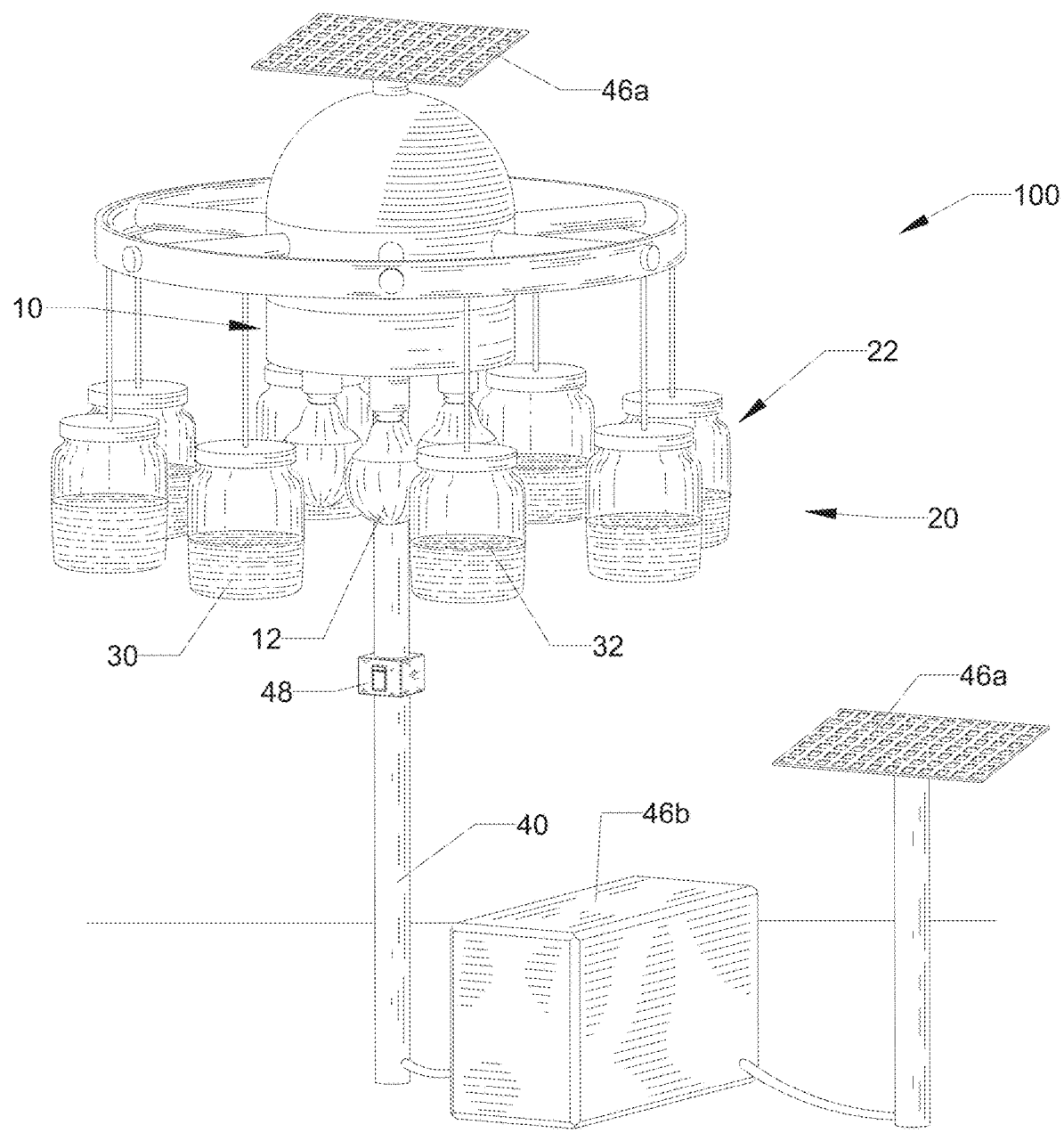
FIG. 5 is a second perspective view of the insect repellent light assembly according to the invention, shown in a representative embodiment using a generator powered by solar panels.
Figure 6:
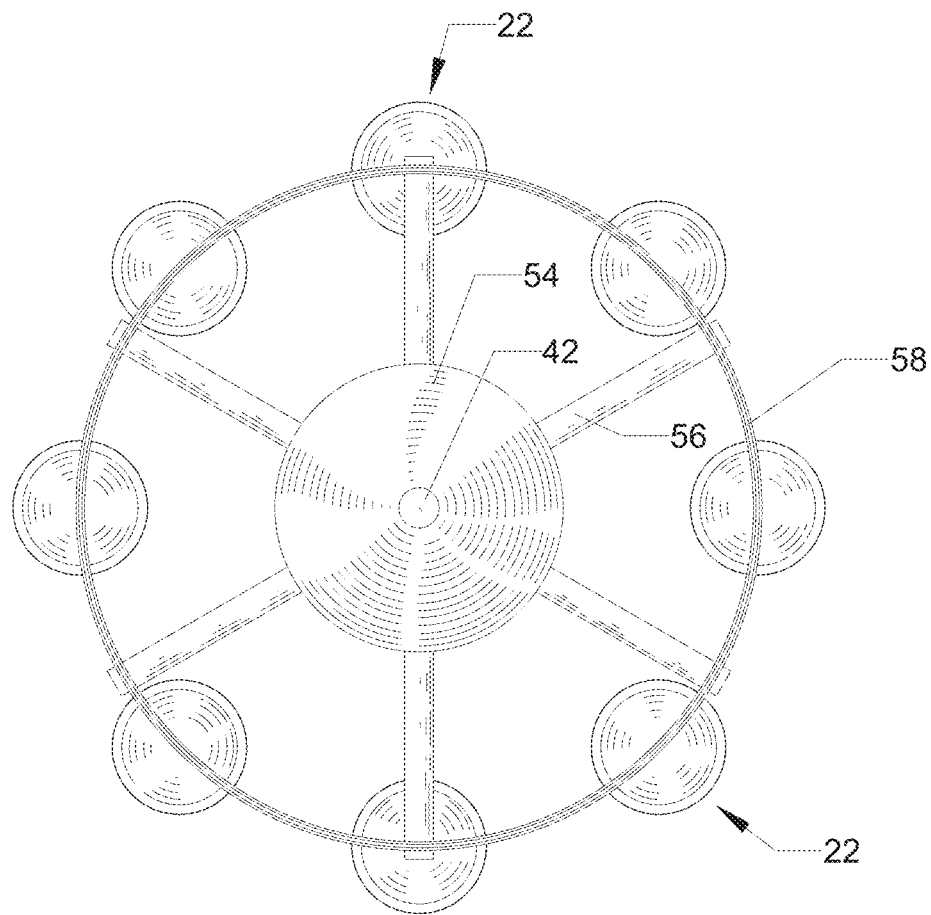
FIG. 6 is a top view of the insect repellent light assembly in FIG. 1.
Figure 7:
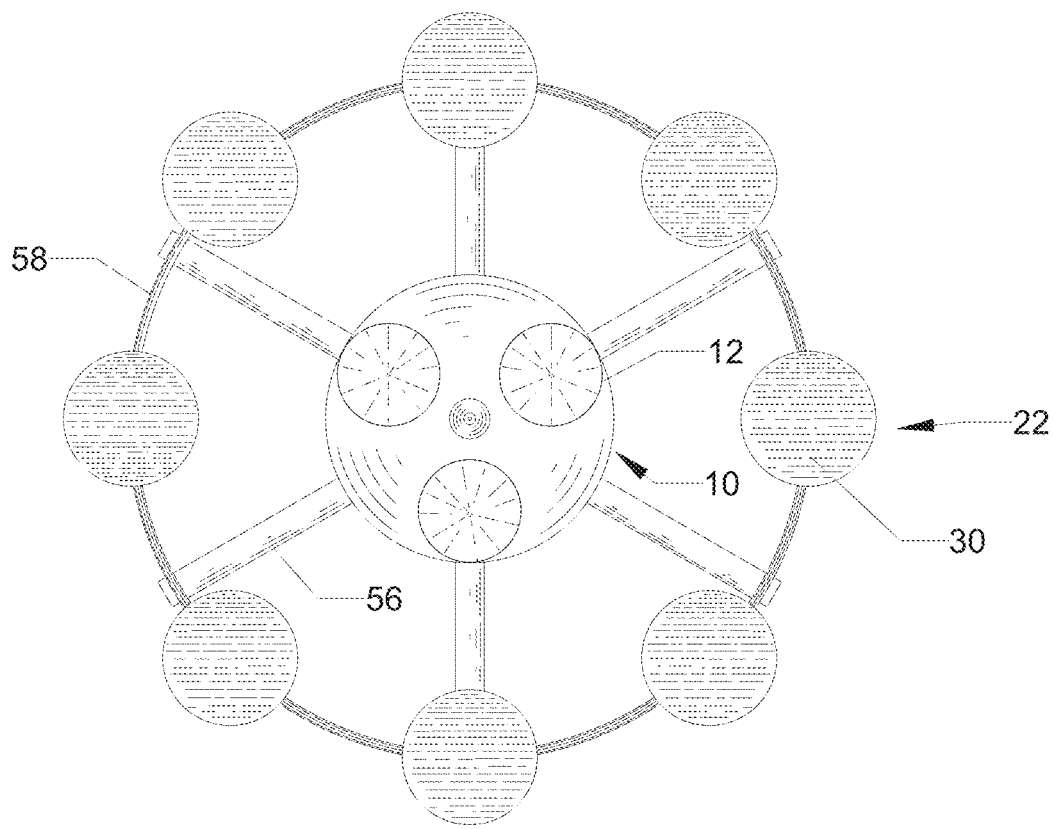
FIG. 7 is a bottom view of the insect repellent light assembly in FIG. 1.
Figure 8:
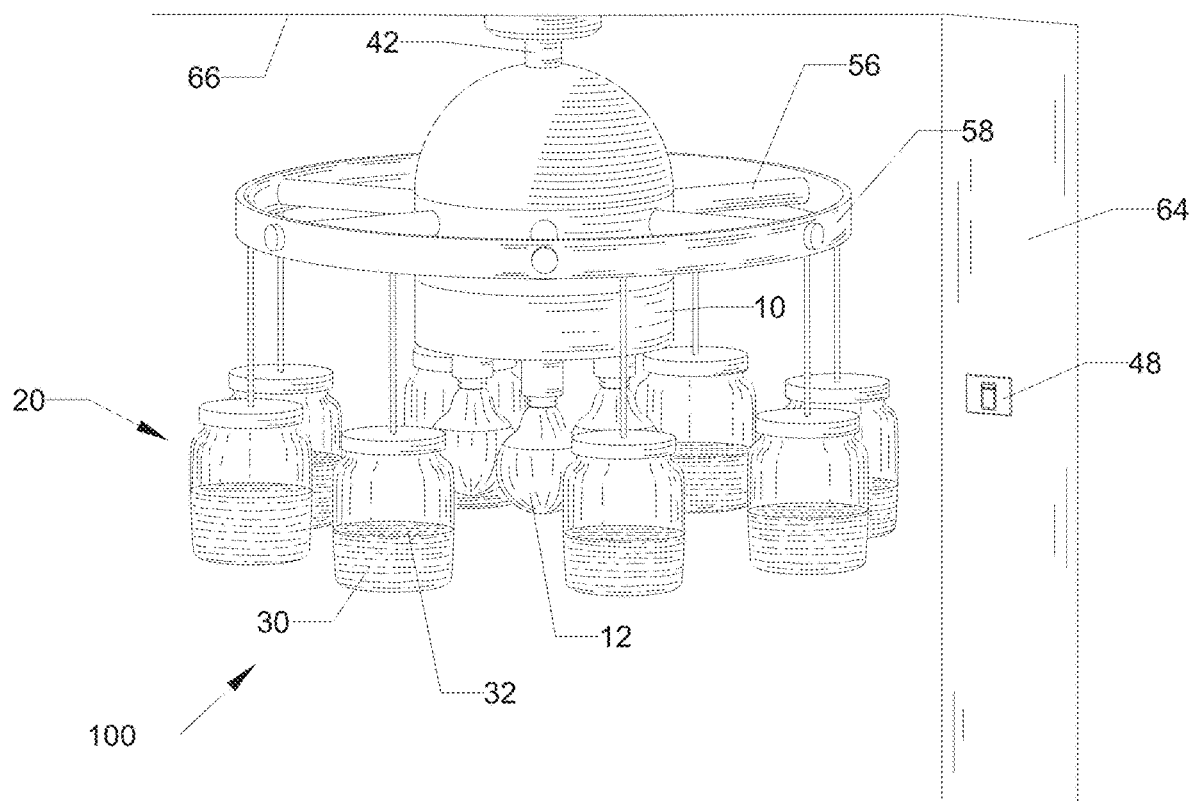
FIG. 8 is a third perspective view of the insect repellent light assembly according to the invention, shown in a representative embodiment as a permanent light fixture attached to a ceiling.
Figure 9:
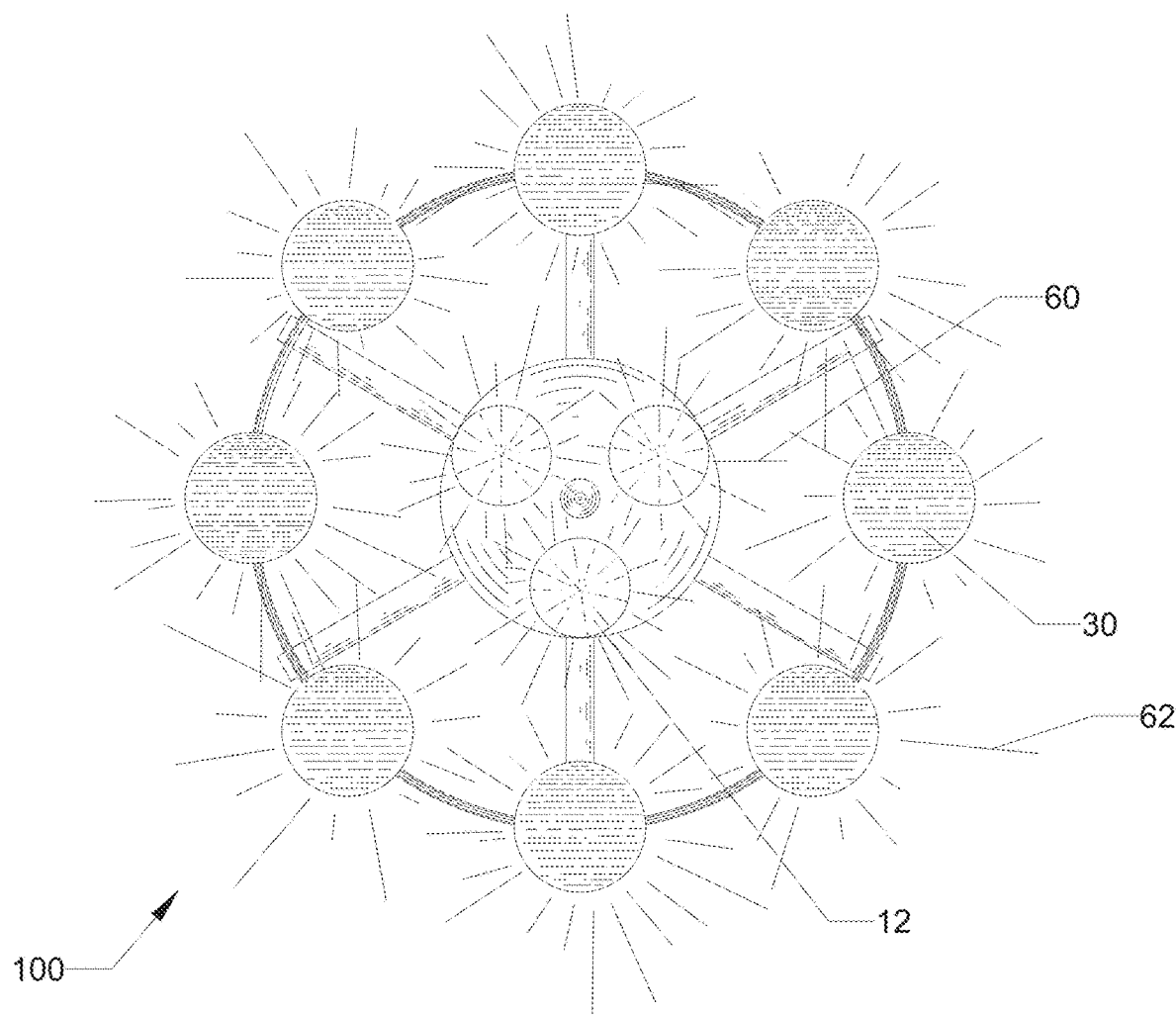
FIG. 9 is a bottom view of the insect repellent light assembly in FIG. 7, shown as it would appear in use.
Figure 10:
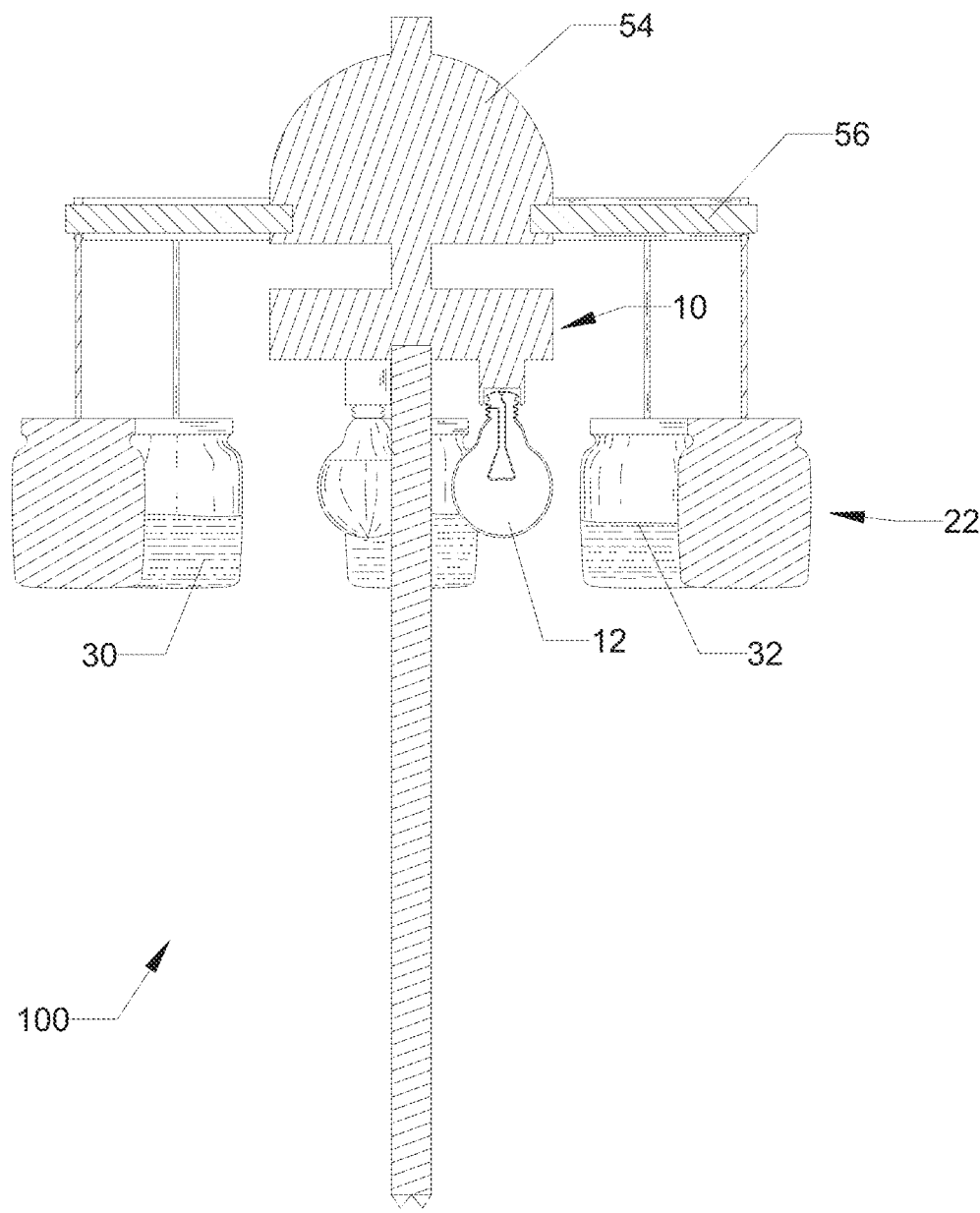
FIG. 10 is a side cross-sectional view of the insect repellent light assembly according to the invention taken along lines A-A in FIG. 3.
Figure 11:
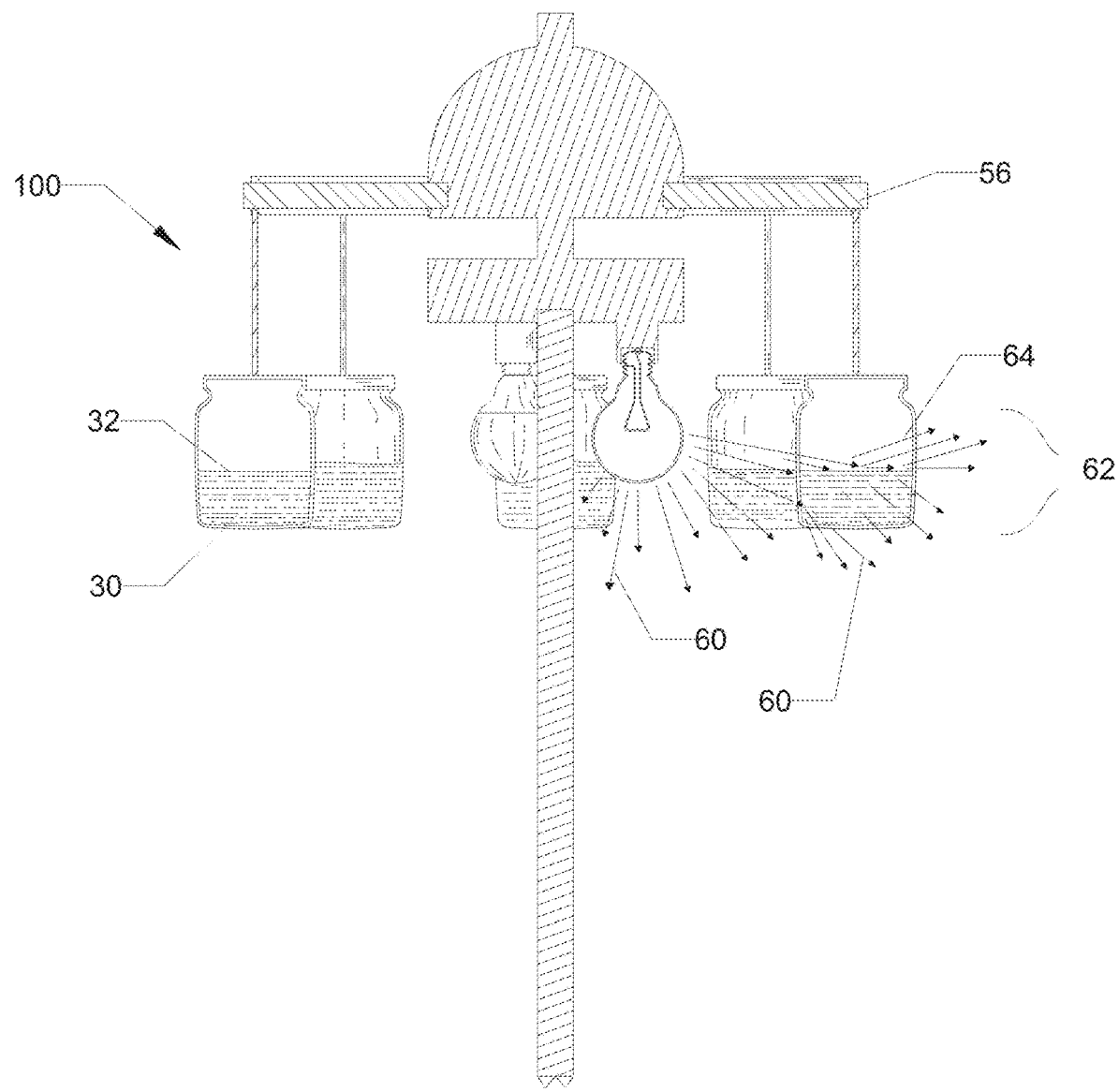
FIG. 11 shows the insect repellent light assembly in FIG. 10 in use, with arrows showing the direction of light waves emitted from a plurality of light sources of the light assembly and showing a redirection of some of the light waves off a surface of a liquid of the assembly.

An insect repellent light assembly according to the invention or assembly 100 and a method of using the assembly or method 200 is shown in FIGS. 1-11. Turning to the FIGS., the assembly 100 is comprised of a light assembly 10 and a container assembly 20.

The light assembly 10 is further comprised of a light source 12, shown in the representative embodiment in the FIGS. as three light bulbs, however the inventor notes that the light source 12 can also be a single source, or be comprised of an array of LEDs or other light emitting sources. An optional cage 14, shown in FIG. 4, may also be included to protect the light source 12 from damage. Light waves 60 emitted by the light source are typically white or daylight, with K values ranging from 2000K to 6500K, however any other light color desired, such as red, blue, yellow, or combinations thereof. In the representative embodiment, the three light bulbs can emit a same light color or different light colors, for instance, a first bulb emits white light, a second bulb emits blue light and a third bulb emits red light, as desired. Many light color combinations and light intensities can be combined and used, as desired. The light source can be any light source including incandescent, fluorescent, LED, and halogen sources. Lumens are adjustable and the inventor notes that if the assembly is used outdoors, the lumen output of the light source is adjusted to provide insect repellent coverage for a desired area. Smaller areas will require fewer lumens, for instance. The inventor notes that the assembly 100 also provides general lighting to an area and lumen recommendations to light up an area can also be used to determine how many lumens are needed.

The lighting assembly is affixed to a top portion 54 of a housing 50, the housing further having a frame 58 and a plurality of arms 56 joining the top portion 54 with the frame 58 such that the housing 50 resembles a wheel with spokes. The container assembly 20 is attached to the frame 58 by one or more supports 52 that suspend the container assembly 20 below the housing 50 and position the container assembly 20 around the lighting assembly 10.

The container assembly 20 is further comprised of one or more containers 22, in the representative embodiment in the FIGS. shown as jar-like containers having a transparent wall 24, an interior cavity 26 adapted to hold a quantity of liquid 30, with a liquid surface 32. In the FIGS., the surface 32 is shown flat, however the inventor notes that depending on the type of liquid in the in the container 22, the surface may in fact be flat, concave or convex and thus the flat surface 32 in the FIGS. is illustrative only and not meant to limit the liquid or the surface 32 used in this disclosure. Typically, the quantity of liquid 30 in the container 22 is less than a total volume capacity of the cavity 26. In some embodiments, the quantity and type of liquid 30 in the cavity 26 can be adjusted by adding or removing liquid, and in other embodiments, the liquid amount and type is not adjustable and the containers 22 are permanently sealed.

The container assembly 20 can also be configured as a single, torus or donut-shaped container, with the light source 12 of the light assembly 10 positioned in a center opening of the donut-shaped container. Other variations can include two or three containers arranged around the light source 12 and many other attractive arrangements are possible. Any embodiments of the container assembly 20 require the container 22 to be positioned so that any light waves 60 emitted from the light source 12 travel through the container wall 22 and a direction of some light waves 60 from emitted from the light source must reflect off the surface 32 of the liquid 30 in the container 22. Ideally, the container assembly 20 encircles the light source 12 to optimize light waves passing through the container wall 22 and reflecting off the surface 32 of the liquid 30.

When light is emitted from the light source 12, the light waves hit the surface 32 of the liquid 30 and are redirected. The redirected light waves 64 cause glare 62, which is the sum of all the redirected light waves 64 and that is particularly visually uncomfortable to insects and thus repels them. The inventor notes that only insects with eyes are repelled and that there are some types of insects at various developmental stages which do not have eyes that are not repelled by the light. The inventor notes that his assembly 100 works on all insects with eyes, including stinging and biting insects. All the insects in a certain area can be repelled by positioning one or more assemblies about 30 to 70 feet apart. The assembly 100 is very bright to human eyes as well, however so long as the human does not stare directly at the assembly 100, the light emitted, glare 62 included, otherwise acts as any other light source, and does not otherwise cause discomfort. There is no harm to the human eye however even if staring directly at the light being emitted; there is a significant amount of glare 62, but no damage will occur to the human eye so the assembly 100 is safe to use around people. The assembly 100 also works during the daytime, where an abundance of natural light has no effect on the assembly 100 or its ability to repel insects. In daylight hours, the glare 62 is even less noticeable to the human eye due to the high amount of background light.

The inventor notes his assembly 100 thus has at least two functions, one as a useful light source and a second as an insect repellent, reducing the equipment needed to transport to a campsite or other place. The inventor also notes that the containers 22 used could be permanently sealed or designed to allow a user to empty or fill them, as needed, to reduce weight as well as reduce the possibility of cracking due to freezing weather conditions.

The inventor notes that his assembly 100 can be modified for use not just as a temporary light source but rather can be for use as installed outdoor lighting fixtures on decks and other spaces. Existing light fixtures can also be retrofitted with one or more containers 22 around the light source with the ability to adjust the liquid 30 in the container cavity 26 or adjust the position of the container 22 to optimally position the surface 32 of the liquid 30 with the light source to create glare 62.

The light source requires a power source 46, and in the representative embodiment shown in the FIGS., and includes battery, solar, and conventional electric or other power sources, including gas and propane powered generators. A power switch 48 is also shown, although the assembly 100 can also be simply turned on and off by detaching the power source 46 by unplugging and forgoing the power switch 48. Ideally, the light source is also dimmable, to allow the user the ability to control the brightness or lumen output of the light source. Typically, this will involve a rheostat 70, shown in the FIGS. as a sliding lever on a combination dimmer/light switch combining the power switch 48 with the rheostat 70, however other ways of controlling the intensity of the light source can also be included but it not necessary for the function of the assembly 100.

The inventor notes that in the prior art some people hang bags of water, with or without pennies in them, as insect repellents, however it is controversial as to whether this practice actually works. The inventor has tried this method, and notes that these bags of water are used with natural light, and hence are useless at night. The idea behind the use of these bags is that light passing through the bags of water causes refraction, changing the speed of the light and thus confusing the compound eyes of the insects. The inventor's assembly 100 is different in that the surface 32 of the liquid 30 and the position of the light source 12 are critical to the operation of the assembly 100, whereas the bags of water do not rely on the surface of the water but primarily focus on the light refraction by passing light through the water itself. At night, light sources such as porch lights or light from bonfires may pass through the bags of water, but the lack of control of the source of light means that results are variable. If the light source is positioned too high or too low relative to the surface 32 of the liquid, the assembly 100 does not repel insects. The inventor believes that a fixed light source 12 is critical for his invention and while a retrofit kit for an existing light fixture can be used, the assembly 100 must have both the light source 12 and the container 22 with the surface 32 of the liquid 30 positioned so that at least 25% of the light waves are redirected off the surface 32 of the liquid 30, causing glare 62.

It is to be understood that the above-described arrangements are only illustrative of the application of the principles of the present invention. Numerous modifications and alternative arrangements may be devised by those skilled in the art without departing from the scope of the present invention.

I claim:

1. An insect repellent assembly, comprising:
   a light source with a light emitting portion;
   a container assembly having a container with a transparent wall and a liquid holding cavity having a total volume capacity;
   wherein the container assembly surrounds the light source so that light waves emitted by the light source pass through the container wall;
   a quantity of liquid housed inside the liquid holding cavity of the container, the quantity of liquid having a surface;
   wherein the quantity of liquid in the container is less than the total volume capacity of the container;
   wherein the light emitting portion of the light source is positioned approximately centered with the surface of the quantity of liquid so that when the light source is powered, at least 25% of a quantity of light waves emitted by the light emitting portion of the light source are directed at the surface; and
   a power source in electrical communication with the light source.

2. The insect repellent assembly in claim 1, wherein the quantity of liquid is further comprised of water.

3. The insect repellent assembly in claim 1, wherein the quantity of liquid is further comprised of oil.

4. The insect repellent assembly in claim 1, wherein the container assembly is a single container having a torus shaped liquid holding cavity and the light source is positioned centrally such that light waves emitted from the light source pass through the container wall.

5. The insect repellent assembly in claim 1, further comprising an upper mount affixed to a top portion of the insect repellent assembly wherein the insect repellent assembly is supported by the upper mount to an overhead surface.

6. The insect repellent assembly in claim 1, further comprising a lower mount disposed as a pole supported on a ground surface.

7. The insect repellent assembly in claim 6, wherein the lower mount is further comprised of a base adapted to be positioned below a ground surface, the lower mount housing wiring electrically connecting the light source to the power source.

8. The insect repellent assembly in claim 1, wherein the power source is a battery or a solar panel, or a combination of the battery and the solar panel.

9. The insect repellent assembly in claim 1, wherein the power source is an electrical generator.

10. The insect repellent assembly in claim 1, wherein the quantity of liquid in the container is adjustable.

11. The insect repellent assembly in claim 1, wherein the light emitting portion of the light source emits light with a Kelvin value of at least 2000K.

12. The insect repellent assembly in claim 1, wherein the light source is comprised of 2 or more light emitting portions.

13. The insect repellent assembly in claim 1, wherein the light source is selected from the group consisting of incandescent, fluorescent, LED, and halogen.

14. The insect repellent assembly in claim 1, further comprising a rheostat communicating with the light source.

15. The insect repellent assembly in claim 1, wherein the container assembly is further comprised of a plurality of containers surrounding the light source.

16. A method of using an insect repellent assembly having a light source, a transparent liquid-holding container, a quantity of liquid less than a total volume of the container, and a power source in communication with the light source, the method comprising the steps of:

positioning the insect repellent assembly at a desired location;

positioning the light source in relation to a surface of the quantity of liquid such that when the light source is powered, light waves emitted from the light source are directed at a surface of the quantity of liquid; and powering on the light source.

17. The method in claim 16, wherein the quantity of liquid in the container is a fixed volume of liquid.

18. The method in claim 16, wherein the light source emits light waves with a Kelvin value of at least 2000K.

19. The method in claim 16, further comprising the step of:

visually assessing whether at least twenty five percent of the light waves emitted by the light source are redirected by reflecting off the surface of the quantity of liquid, after the step of powering; and adjusting the position of the light source or the surface of the quantity of liquid until at least twenty five percent of the light waves emitted by the light source are redirected by reflecting off the surface.

\* \* \* \* \*